Patented Nov. 14, 1922.

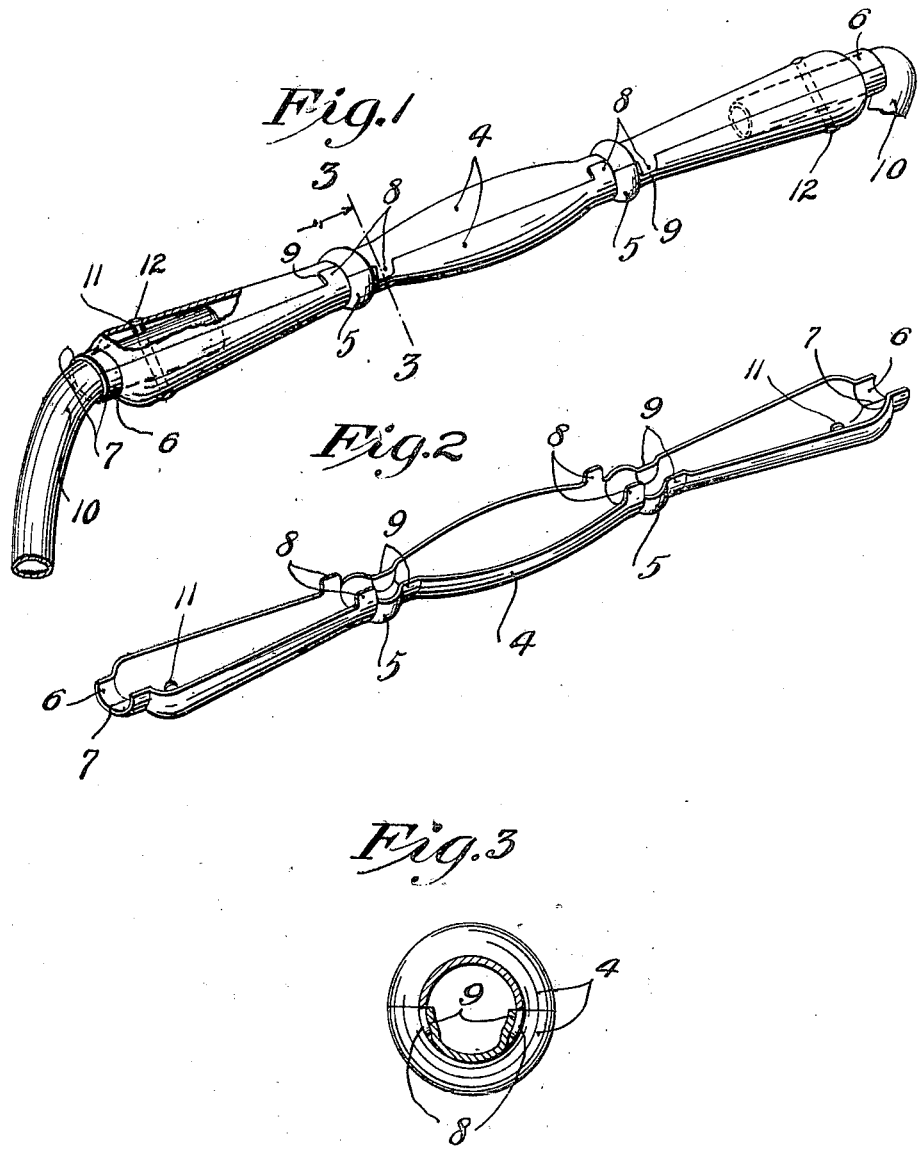

1,435,662

UNITED STATES PATENT OFFICE.

MEYERS ROSENSTEIN, OF MINNEAPOLIS, MINNESOTA.

HANDLE BAR.

Application filed November 19, 1921. Serial No. 516,434.

*To all whom it may concern:*

Be it known that I, MEYERS ROSENSTEIN, a citizen of the United States, residing at Minneapolis, in the county of Hennepin and State of Minnesota, have invented certain new and useful Improvements in Handle Bars; and I do hereby declare the following to be a full, clear, and exact description of the invention, such as will enable others skilled in the art to which it appertains to make and use the same.

My invention has for its object to provide a commercially practicable tubular pressed metal handle bar especially adapted for use as a handle bar for baby carriages, and, generally stated, the invention consists of the novel construction, arrangement and combinations of parts hereinafter described and defined in the claims.

Hitherto, handle bars for baby carriages and the like have generally been made of wood. To be at all serviceable, such wooden handle bars must be made of a very good grade of timber, and when thus made, are by no means inexpensive structures and, moreover, not nearly as durable as when made of metal. My invention provides a metallic handle bar adapted to be stamped from sheet metal, preferably sheet steel, and to be commercially produced at as low or even lower cost than a good grade wooden handle bar. This result I accomplish by making the tubular handle bar out of two semi-tubular die-cut and stamped sheet metal sections that extend the full length of the handle bar and when put together form a complete tubular handle bar. Metal handle bars designed in accordance with my invention, are well adapted to be nickel-plated and are preferably thus treated, but may be otherwise finished. They have an ornamental appearance and are much stronger and more durable than wooden handle bars.

In the accompanying drawings, which illustrate the improved handle bar in its preferred form, like characters indicate like parts throughout the several views.

Referring to the drawings:

Fig. 1 is a perspective showing the improved handle bar applied to one form of handle;

Fig. 2 is a perspective showing one of the semi-tubular sections of the handle bar; and Fig. 3 is an enlarged transverse section taken on the line 3—3 of Fig. 1.

The two semi-tubular stamped sheet metal handle bar sections 4, as preferably designed, are formed with bulged central portions, with outwardly flaring handles or end portions, and between said central and end portions with outwardly bulged beads 5. The extreme outer ends of the handles or end portions of the semi-tubular sections are contracted preferably in the form of sleeve sections 6 and, to make these end portions more readily contractible in the dies, they are primarily formed with end notches, which, when pressed together, form tight end slits 7.

The two semi-tubular sections 4 are preferably made exactly alike, so that they may be stamped by the same dies. Each is provided on one side of its beads 5 with outstanding clinching lugs 8 and on the opposite sides thereof with converging lug-receiving seats 9 that are pressed slightly inward.

The semi-tubular sections 4, on opposite sides of their longitudinal centers, are bi-symmetrical or exactly alike, except that the lugs 8 are always at one side of the beads and the lug seats at the opposite sides of the beads. When the two tubular sections are to be put together to form the complete tubular handle, one is turned end for end in respect to the other so that the lugs 8 of the one section will be aligned with the lug seats 9 of the other section and the bead sections 5 of the two sections set in alignment. Then, when the clinching lugs 8 are pressed into the diverging seats 9, their outer surfaces will be flush with the outer surface of the handle and the two sections 4 will be firmly and rigidly locked together, as clearly shown in Fig. 3, by reference to which it will be noted that the converging impressed lugs 8 hold against the converging seats 9 with a sort of a dove-tailed clamping action.

The clinched lugs 8 very firmly secure the central portion of the handle bar sections together, but to more firmly connect the outer portions of said sections, the latter are provided with rivet holes 11 through which rivets 12 are passed. In Fig. 1, the tubular metallic handle bar is shown as applied to the inturned ends of push bars 10, the laterally bent ends of which latter are passed inward through the sleeve portions 6 and are rigidly secured to the handle bar by the rivets 12, which are also passed through the ends of said push bars, as best shown in Fig. 1. Of course, this handle bar may be applied to push bars, rods or the like in different ways, but the arrangement illustrated in Fig. 1 is preferred and involves novelty in that the rivets 12 not only connect together the handle bar sections but anchor the handle bar to the push bars.

From the foregoing, it is evident that the handle bar described, stamped and formed by dies from sheet metal, may be made at very low cost and, at the same time, will be very strong, durable and even ornamental in appearance.

What I claim is:

1. A tubular pressed metal handle bar made complete from connected stamped metal sections, and push bars having ends telescoped into the ends of said metallic handle bar.

2. A tubular metallic handle bar made complete of two semi-tubular rigidly connected sections, push bars having ends telescoped into the ends of said tubular handle bar, and rivets passed through and connecting the outer end portions of said semi-tubular sections together and to the inner ends of said push bars.

3. A tubular handle bar made of two semi-tubular sections, the sections having clinching lugs overlapping and clinched against the companion sections, said semi-tubular sections being of identical structure, the one section being reversed end for end in respect to the other.

4. A tubular handle bar made up of two semi-tubular pressed metal sections each having clinching lugs and clinching lug seats, the clinching lugs of said sections being pressed into clinching lug seats of companion sections, said semi-tubular sections being of identical structure reversed end for end the one in respect to the other.

5. A tubular pressed metal handle bar made complete from connected stamped metal sections, the ends of said handle bar being contracted and formed with sleeve-like extensions, said sleeve-like extensions and the contracted ends of said handle bar having slits pressed tightly together at points between the joints between the two sections.

6. A tubular metallic handle bar made complete of two semi-tubular rigidly connected sections, both of which extend from end to end of said handle bar, said semi-tubular sections being formed with supplemental out-pressed beads between their lugs and lug seats.

7. The structure defined in claim 1 in which said semi-tubular sections are formed with supplemental out-pressed beads between their lugs and lug seats.

In testimony whereof I affix my signature.

MEYERS ROSENSTEIN.